2,985,639
Patented May 23, 1961

1

2,985,639
POLYMERISATION OF ETHYLENE WITH CATALYSTS OF ZIRCONIUM HYDRIDE AND A METAL HALIDE

Gilbert Bo, Lyon, and Philippe Perras, Collonge au Mont d'Or, France, assignors to Societe des Usines Chimiques Rhone-Poulenc, Paris, France, a corporation of France No Drawing. Filed Apr. 24, 1958, Ser. No. 730,549
Claims priority, application France Apr. 30, 1957
3 Claims. (Cl. 260—94.9)

This invention relates to new catalysts for the polymerisation of ethylene to give products of high molecular weight and to their use for this purpose.

According to the present invention polymerisation products of ethylene which may have the form of fats, waxes or solids suitable for use as plastic materials are made by a process which comprises subjecting ethylene to polymerisation in the presence of a catalyst comprising or formed from zirconium hydride. The zirconium hydride may be used alone or in association or combination with a metal halide or oxyhalide as more fully described below.

Technical zirconium hydride, which is a black powder, may be employed. It must be dried very carefully before use.

When the zirconium hydride is used alone, e.g. at a temperature in the neighborhood of 200° C. and under an ethylene pressure of 50–100 atmospheres, there can be obtained solid polymerisation products of high molecular weight. The rate of polymerisation is rather low.

It is, therefore, usually preferred to use the zirconium hydride in association or combination with a metal halide or oxyhalide, especially one of the following: zinc chloride, aluminium chloride, titanium tetrachloride and trichloride, vanadium tetrachloride, molybdenum chloride, tungsten oxychloride and ferric chloride. The zirconium hydride and metal halide or oxyhalide may be employed in molecular proportions between about 1:2 and 20:1 or 30:1.

Catalysts derived from zirconium hydride and a metal halide or oxyhalide may be made by simply mixing the two components.

It is preferred, however, to preform the catalyst by heating the zirconium hydride and metal halide or oxyhalide in an inert non-oxidising atmosphere which is substantially free from ethylene and other unsaturated hydrocarbons polymerisable under the conditions employed. For example, the catalyst components may be heated together to a temperature between about 100° or 150° C. and 400° C. for several hours in an inert atmosphere, for example under nitrogen. The reaction may be effected in the presence or absence of liquid diluents, preferably consisting of one or more hydrocarbons free from aliphatic unsaturation, i.e. saturated aliphatic or cycloaliphatic hydrocarbons or aromatic hydrocarbons.

When a catalyst preformed in this way is used, the polymerisation of the ethylene is more readily controlled and products of an excellent degree of uniformity can be reproducibly obtained.

The polymerisation of ethylene with the aid of the catalysts described above is preferably carried out at temperatures between about 100° and 250° C. and under pressures of about 50–150 atmospheres; however, conditions outside these ranges can be employed. The polymerisation can be carried out either in the absence or in the presence of an anhydrous diluent, especially one or more hydrocarbons free from aliphatic unsaturation. For example, when such a diluent has been used in preparing the catalyst the same diluent, with or without a further quantity thereof, may be used in the polymerisation step.

The polyethylene formed in the polymerisation may be freed from diluent and from catalyst by any known means, for example by heating it with hot methanol saturated with acid and/or by solution in a hot solvent, hot filtration and reprecipitation by cooling or evaporating the solvent.

By suitably adjusting the conditions under which the catalyst is made and the polymerisation carried out, it is possible to obtain polyethylenes having a wide range of properties including polymers having the consistency of fats and waxes as well as solid products having properties required for the various industrial uses.

The invention is illustrated by the following examples, without being limited in any way:

*Example I*

8.6 g. of zirconium hydride dried to constant weight in an oven at 100° C. and 8 stainless steel balls are introduced into a 500 cc. stainless steel autoclave having lateral stirring from which the air has been displaced by nitrogen. 37 g. of ethylene are then introduced at room temperature (pressure about 50 atm.). The mixture is then heated at 200° C. with constant agitation. The pressure rises to a maximum of 90 atm. at 200° C. and then slowly decreases. After 22 hours, it has fallen to 72 atm. Heating is then interrupted, cooling is applied, the unreacted ethylene is blown off, and the polymer is recovered in the form of a hard black mass containing the catalyst. This polymer is purified by solution in hot cyclohexane, hot filtration and reprecipitation. 5 g. of solid white product are thus obtained.

*Example II*

8 g. of previously dried zirconium hydride, 3.4 g. of titanium tetrachloride, 100 cc. of pure cyclohexane and 57 g. of ethylene (40 atm. at 20° C.) are introduced into the same apparatus. The mixture is then heated with agitation at 200° C. The pressure rises to a maximum of 130 atm. and then falls to 18 atm. in 20 hours. The mixture is then cooled, unreacted ethylene is blown off and the polymer is collected and purified. 51 g. of a solid white product are obtained, having a specific viscosity of 0.146 (measured on a 4‰ solution in tetralin at 130° C.).

*Example III*

10 g. of zirconium hydride, 4 g. of titanium trichloride, 100 cc. of cyclohexane and 57 g. of ethylene are introduced into the same autoclave as before, and polymerisation is effected at 200° C. for 23 hours. The pressure rises to a maximum value of 109 atm. and, after 23 hours, falls to 57 atm. The weight of crude polymer, after deducting the weight of catalyst initially introduced, is 37 g. After purification 34 g. of completely solid white polymer having a specific viscosity of 0.72 are obtained.

*Example IV*

1.8 g. of zirconium hydride and 3.5 g. of zinc chloride are introduced into the autoclave described in Example I. The air is displaced by nitrogen and the mixture is heated for 15 hours at 300° C. The mixture is then cooled to room temperature, and 100 cc. of cyclohexane and 62 g. of ethylene are introduced, and polymerisation is effected for 2 hours at 200° C. The pressure reaches a maximum of 138 atm. and falls again to 59 atm. after 2 hours. There are obtained 45 g. of polymer, which takes the form of a very consistent wax after purification.

*Example V*

A catalyst is prepared by heating 7.3 g. of zirconium hydride and 2 g. of aluminum chloride for 5 hours at 200° C. under nitrogen. There are introduced over this catalyst 62 g. of ethylene and 100 cc. of cyclohexane, and the mixture is polymerised for 21 hours at 200° C. The polymers obtained, which separate by reason of their different solubilities in cyclohexane, consist of 4 g. of solid product insoluble in cyclohexane, 7 g. of consistent wax soluble in cyclohexane in the cold, and 19 g. of light oil soluble in cyclohexane and distilling it.

*Example VI*

The procedure of Example V is followed, except that the aluminum chloride is replaced by 3.6 g. of vanadium tetrachloride. Polymerisation for 21 hours at 200° C. in cyclohexane, with an initial quantity of ethylene of 68 g., gives 10 g. of solid polymer insoluble in cyclohexane, 6 g. of wax and 12 g. of oil soluble in cyclohexane.

*Example VII*

The catalyst is prepared by heating 8 g. of zirconium hydride with 3 g. of molybdenum pentachloride for 5 hours at 200° C. After cooling 100 cc. of cyclohexane and 61 g. of ethylene are introduced and polymerisation is effected for 22 hours at 200° C. 4 g. of completely solid polymer are obtained.

*Example VIII*

9.1 g. of zirconium hydride are heated for 16 hours at 200° C. under an inert atmosphere with 2 g. of tungsten oxychloride ($WOCl_4$), 73 g. of ethylene are heated at 200° C. for 22 hours with the resulting catalyst in the presence of cyclohexane. 22 g. of a solid polymer having specific viscosity 1.3 are obtained.

*Example IX*

A catalyst is prepared by heating 8 g. of zirconium hydride and 3 g. of ferric chloride for 5 hours at 200° C. under nitrogen. A test polymerisation carried out for 23 hours at 200° C. in the presence of cyclohexane on 62 g. of ethylene gives 20 g. of solid polymer.

*Example X*

There are introduced into the autoclave described in Example I, under nitrogen, 8.3 g. of zirconium hydride, 3.4 g. of titanium tetrachloride and 8 stainless steel balls. This mixture is heated with agitation for an hour and a half at 300° C. After cooling, 100 cc. of pure cyclohexane and 64 g. of ethylene are introduced into the autoclave and the mixture is agitated and again heated to 200° C. The maximum pressure reached is 134 atm., this pressure thereafter decreasing progressively to 13 atm. after 24 hours. The autoclave is then cooled and the unreacted ethylene is blown off.

Solid black polymer impregnated with diluent is withdrawn from the autoclave and is purified as indicated in Example I. 59 g. of a solid white polymer having specific viscosity 0.224 are obtained.

*Example XI*

Zironium hydride is dried by heating at 400° C. in an inert atmosphere. The hydride thus treated gives, on heating at 200° C. with titanium tetrachloride under the same conditions as in Example IX, a very active catalyst.

A test polymerisation of a duration of 5 hours 30 minutes at 200° C. on 67 g. of ethylene gave 57 g. of a polymer having specific viscosity 0.4. This represents a yield of 85%.

We claim:
1. Process for the production of polymers of ethylene, which comprises heating ethylene to a temperature of 100°–250° C. under a pressure of 50–150 atmospheres in the presence of a catalyst consisting essentially of the product resulting from the reaction at a temperature of 150°–400° C. and in an inert atmosphere of zirconium hydride and a compound selected from the group which consists of zinc chloride, and titanium trichloride and tetrachloride, in the substantial absence of hydrocarbons capable of polymerising under the conditions employed, the zirconium hydride and the said compound being employed in molecular proportions between 1:2 and 30:1.

2. Process according to claim 1, which comprises heating the ethylene with the catalyst in the presence of a liquid hydrocarbon diluent free from aliphatic unsaturation.

3. Process according to claim 1, which comprises effecting the reaction between the zirconium hydride and the said compound in the presence of a liquid hydrocarbon diluent free from aliphatic unsaturation.

References Cited in the file of this patent

UNITED STATES PATENTS

| | | |
|---|---|---|
| 2,834,768 | Friedlander | May 13, 1958 |
| 2,839,518 | Brebner et al. | June 17, 1958 |
| 2,891,044 | Matlack | June 16, 1959 |

FOREIGN PATENTS

| | | |
|---|---|---|
| 547,618 | Belgium | Nov. 7, 1956 |